… [54] PACKET INSPECTION DEVICE, MOBILE COMPUTER AND PACKET TRANSFER METHOD IN MOBILE COMPUTING WITH IMPROVED MOBILE COMPUTER AUTHENTICITY CHECK SCHEME

[75] Inventors: Atsushi Inoue; Masahiro Ishiyama; Atsushi Fukumoto; Yoshiyuki Tsuda; Atsushi Shimbo; Toshio Okamoto, all of Tokyo, Japan

[73] Assignee: Kabushiki Kaisha Toshiba, Kawasaki, Japan

[21] Appl. No.: 08/957,773

[22] Filed: Oct. 24, 1997

[30] Foreign Application Priority Data

Oct. 25, 1996 [JP] Japan ................................. 8-283992

[51] Int. Cl.$^7$ ........................................... G06F 11/00
[52] U.S. Cl. ............................................ 713/201; 709/225
[58] Field of Search ................................ 713/201; 709/217, 709/218, 225; 380/23, 25

[56] References Cited

U.S. PATENT DOCUMENTS

| | | | |
|---|---|---|---|
| 5,159,592 | 10/1992 | Perkins | 370/338 |
| 5,451,757 | 9/1995 | Heath, Jr. | 235/382 |
| 5,535,276 | 7/1996 | Ganesan | 380/25 |
| 5,623,605 | 4/1997 | Keshav et al. | 395/200.66 |
| 5,720,035 | 2/1998 | Allegre et al. | 713/201 |
| 5,734,820 | 3/1998 | Howard et al. | 713/201 |
| 5,781,725 | 7/1998 | Saito | 713/201 |
| 5,805,820 | 9/1998 | Bellovin et al. | 713/201 |
| 5,812,763 | 9/1998 | Teng | 713/201 |
| 5,825,759 | 10/1998 | Liu | 370/331 |
| 5,826,014 | 10/1998 | Coley et al. | 713/201 |
| 5,828,846 | 10/1998 | Kirby et al. | 709/238 |
| 5,835,726 | 11/1998 | Shwed et al. | 713/201 |
| 5,864,667 | 1/1999 | Barkan | 713/201 |
| 5,887,140 | 3/1999 | Itsumi et al. | 713/201 |
| 5,892,903 | 4/1999 | Klaus | 713/201 |
| 5,892,905 | 4/1999 | Brandt et al. | 713/201 |
| 5,894,551 | 4/1999 | Huggins et al. | 713/201 |
| 5,894,552 | 4/1999 | Bouthillier et al. | 713/201 |
| 5,896,499 | 4/1999 | Mckelvey | 713/201 |

OTHER PUBLICATIONS

Perkins, IETF RFC 2002, "IP mobility support".
Atkinson, IETF RFC 1825, "Security Architecture for the Internet Protocol".
Atkinson, IETF RFC 1826, "IP Authentication Header".
Atkinson, IETF RFC 1827, "IP Encapsulating Security Payload".
Metzger, IETF RFC 1828, "IP Authentication using Keyed MD5".

*Primary Examiner*—Albert De Cady
*Assistant Examiner*—Nguyen Xuan Nguyen
*Attorney, Agent, or Firm*—Foley & Lardner

[57] ABSTRACT

A packet transfer scheme for realizing a control of a packet inspection device to pass only packets from those mobile computers that can be recognized as authenticated among non-management target mobile computers that had moved inside the network, to outside the network. A packet inspection device judges whether a passing of a packet transmitted from a mobile computer other than own management target computers to outside the own network is permitted or not, according to a mobile computer identification information contained in the packet, and sends a message indicating a refusal of the passing of the packet to the mobile computer when the passing of the packet is judged to be not permitted; and then transfers the packet when the passing of the packet is judged to be permitted; and also checks whether a user information regarding a user of the mobile computer satisfies a prescribed condition or not, upon receiving a message requesting a key information for generating the mobile computer identification information from the mobile computer, and returns a requested key information to the mobile computer when the user information satisfies the prescribed condition.

15 Claims, 11 Drawing Sheets

FIG.7 | IP HEADER | DATA (REGISTRATION REQUEST) |

IP HEADER (REGISTRATION REQUEST)
    SOURCE=PRIVATE ADDRESS OF MN
    DESTINATION=PRIVATE ADDRESS OF HA

FIG.8 | IP HEADER | ICMP (PASSING REFUSE MESSAGE) |

IP HEADER
    SOURCE=GLOBAL ADDRESS OF GW1
    DESTINATION=CARE-OF ADDRESS OF MN

FIG.9 | IP HEADER | DATA (KEY REQUEST) |

IP HEADER
    SOURCE=CARE-OF ADDRESS OF MN
    DESTINATION=GLOBAL ADDRESS OF GW1

FIG.10

| IP HEADER1 | KEY | AH | INNER IP HEADER | DATA (REGISTRATION REQUEST) |
|---|---|---|---|---|

IP HEADER1
    SOURCE=CARE-OF ADDRESS OF MN
  DESTINATION=GLOBAL ADDRESS OF GW1
INNER IP HEADER (REGISTRATION REQUEST)
    SOURCE=PRIVATE ADDRESS OF MN
  DESTINATION=PRIVATE ADDRESS OF HA

FIG.11

| IP HEADER1 | KEY | AH | INNER IP HEADER | DATA (REGISTRATION RESPONSE) |
|---|---|---|---|---|

IP HEADER1
    SOURCE=GLOBAL ADDRESS OF GW1
  DESTINATION=CARE-OF ADDRESS OF MN
INNER IP HEADER (REGISTRATION RESPONSE)
    SOURCE=PRIVATE ADDRESS OF HA
  DESTINATION=PRIVATE ADDRESS OF MN

FIG.13

| IP HEADER | KEY | AH | ESP | INNER IP HEADER | DATA (REGISTRATION REQUEST) |

IP HEADER (KEY)
    SOURCE=CARE-OF ADDRESS OF MN
    DESTINATION=GLOBAL ADDRESS OF GW0
INNER IP HEADER (REGISTRATION REQUEST)
    SOURCE=PRIVATE ADDRESS OF MN
    DESTINATION=PRIVATE ADDRESS OF HA

FIG.14

| IP HEADER | ICMP (PASSING REFUSE MESSAGE) |

IP HEADER
    SOURCE=GLOBAL ADDRESS OF GW1
    DESTINATION=CARE-OF ADDRESS OF MN

FIG.15

| IP HEADER | DATA (KEY REQUEST) |

IP HEADER
    SOURCE=CARE-OF ADDRESS OF MN
    DESTINATION=GLOBAL ADDRESS OF GW1

FIG.16

| IP HEADER1 | KEY1 | AH | IP HEADER2 | KEY2 | AH | ESP | INNER IP HEADER | DATA (REGISTRATION REQUEST) |
|---|---|---|---|---|---|---|---|---|

IP HEADER1
 SOURCE=CARE-OF ADDRESS OF MN
 DESTINATION=GLOBAL ADDRESS OF GW1
IP HEADER2
 SOURCE=CARE-OF ADDRESS OF MN
 DESTINATION=GLOBAL ADDRESS OF GW0
INNER IP HEADER (REGISTRATION REQUEST)
 SOURCE=PRIVATE ADDRESS OF MN
 DESTINATION=PRIVATE ADDRESS OF HA

FIG.17

| IP HEADER1 | KEY1 | AH | IP HEADER2 | KEY2 | AH | ESP | INNER IP HEADER | DATA (REGISTRATION RESPONSE) |
|---|---|---|---|---|---|---|---|---|

IP HEADER1
 SOURCE=GLOBAL ADDRESS OF GW1
 DESTINATION=CARE-OF ADDRESS OF MN
IP HEADER2
 SOURCE=GLOBAL ADDRESS OF GW0
 DESTINATION=CARE-OF ADDRESS OF MN
INNER IP HEADER (REGISTRATION RESPONSE)
 SOURCE=PRIVATE ADDRESS OF HA
 DESTINATION=PRIVATE ADDRESS OF MN

PACKET INSPECTION DEVICE, MOBILE COMPUTER AND PACKET TRANSFER METHOD IN MOBILE COMPUTING WITH IMPROVED MOBILE COMPUTER AUTHENTICITY CHECK SCHEME

BACKGROUND OF THE INVENTION

1. Field of the Invention

The present invention relates to a packet inspection device for inspecting a packet to be transferred from inside the network to outside the network, a mobile computer capable of carrying out cipher communications while moving among inter-connected networks, and a packet transfer method to be carried out the packet inspection device and the mobile computer.

2. Description of the Background Art

In conjunction with availability of a computer system in smaller size and lower cost and a more enriched network environment, the use of computer system has been rapidly expanded into variety of fields, and there is also a transition from a centralized system to a distributed system. In this regard, in recent years, because of the advance and spread of the computer network technology in addition to the progress and improved performance of the computer system itself, it has become possible to realize not only a sharing of resources such as files and printers within an office but also communications (electronic mail, electronic news, file transfer etc.) with outside of an office or organization, and these communications are now widely used.

In particular, in recent years, the use of the world's largest computer network called Internet has become very popular, and there are new computer businesses for connecting to the Internet and utilizing open information and services, or for providing information and services to external users who make accesses through the Internet. In addition, new technological developments are made in relation to the use of the Internet.

Also, in conjunction with the spread of such networks, there are technological developments regarding the mobile computing. In the mobile computing, a user carries along a portable computer terminal and makes communications while moving over networks. In some cases, the user may change a location on a network while continuing the communication, so that there is a need for a scheme that manages a changing address of a mobile computer on a network during such a communication in order to route the communication content correctly.

In general, in a case of realizing the mobile computing, a router (home agent) for managing the visiting site information of the mobile computer is provided at a network (home network) to which the mobile computer belongs, and when the mobile computer is away from the home network, the mobile computer sends a registration message for indicating a current location to this home agent. When this registration message is received, the transmission of data destined to the mobile computer is realized by sending it to the home agent of the mobile computer, and carrying out the data routing control with respect to the mobile computer by encapsulating an IP packet destined to an original address of the mobile computer within a packet destined to a current location address of the mobile computer.

For example, in FIG. 1, this role is played by a home agent (HA) 5 in a case where the mobile computer 2 that originally belongs to the home network 1a moves to another network 1b and carries out the communication with another computer (correspondent host: CH) 3 within the other network 1c. This is a scheme called mobile IP which is currently in a process of being standardized by the mobile-IP working group of the IETF which is the standardizing organization for the Internet (see, IETF RFC 2002, IP mobility support (C. Perkins)).

Now, in the mobile IP, when the mobile computer moves to a new visiting site, it is necessary to send a registration message regarding the current location to the home agent. In this case, depending on a type of the network to which the mobile computer has moved, the handling of the message issued by the mobile computer may be different.

For example, when the mobile computer moved to a network which is familiar to the home network of the mobile computer so that a gateway (firewall) provided at an exit of that network freely allows the transmission of the registration message to outside the network, it is possible for the mobile computer to carry out the operation exactly as specified by the mobile IP.

On the other hand, in a general network which treats the mobile computer as visiting (or intruding) inside the network from outside the network, it is judged to be dangerous to freely allow the transmission of the registration message issued by the mobile computer to outside the network, from a viewpoint of the security. In such a case, it becomes necessary for the mobile computer to recognize that it is currently located in a network which treats it as an intruder, and carries out the transmission of the registration message to the home agent after obtaining a permission for external access by carrying out a processing for establishing the own identification with respect to the gateway. Also, even in the actual data transmission after the completion of the registration message transmission, it is necessary to carry out the communication while maintaining the own identification with respect to the gateway.

However, in the conventional mobile IP scheme, the routing control and the mobile computer location registration have been specified under the assumption that each communication node is assigned with a unique IP address and capable of exchanging control packets freely, so that at a time of the actual operation in a case of supporting a mobile computer capable of carrying out communications while moving among inter-connected networks, there has been no operation specification on the network operating policy regarding a kind of organization to which the visited network of the mobile computer belongs. For this reason, especially when the mobile computer has moved to a network which does not freely allow the external access to an internal computer in view of the security, there are cases where even a registration message for a new location which is sent immediately after the location change cannot reaches the home agent on the home network of the mobile computer so that the trouble is caused in the operations of the mobile IP scheme regarding the mobile computer.

SUMMARY OF THE INVENTION

It is therefore an object of the present invention to provide a packet inspection device and a packet transfer method which are capable of realizing a control to pass only packets from those mobile computers that can be recognized as authenticated among non-management target mobile computers that had moved inside the network, to outside the network.

It is another object of the present invention to provide a mobile computer and a packet transfer method which are capable of realizing such a control that, when the mobile computer capable of carrying out communications while moving among inter-connected networks has moved to a network which initially regards this mobile computer as an intruder, the authenticity of this mobile computer is checked between this mobile computer and the packet inspection device so that packets from this mobile computer can be passed to outside the network from the packet inspection device.

According to one aspect of the present invention there is provided a packet inspection device for inspecting packets transmitted from a computer located inside a network under own management toward another computer located outside said network, comprising: a judging unit for judging whether a passing of a packet transmitted from a mobile computer other than own management target computers to outside said network is permitted or not, according to a mobile computer identification information contained in said packet, and sending a message indicating a refusal of the passing of said packet to said mobile computer when the passing of said packet is judged to be not permitted; a transfer unit for transferring said packet when the judging unit judges that the passing of said packet is permitted; and a key information returning unit for checking whether a user information regarding a user of said mobile computer satisfies a prescribed condition or not, upon receiving a message requesting a key information for generating the mobile computer identification information from said mobile computer, and returning a requested key information to said mobile computer when the user information satisfies the prescribed condition.

According to another aspect of the present invention there is provided a mobile computer for carrying out communications while moving among inter-connected networks, comprising: a first transmission unit for transmitting a registration message containing a current location information of the mobile computer to a mobile computer management device, when the mobile computer management device for managing a location information of the mobile computer and transferring packets destined to the mobile computer to a current location of the mobile computer is provided at a network other than a currently located network of the mobile computer; a second transmission unit for transmitting a request message for requesting a key information for generating a mobile computer identification information, to a packet inspection device for inspecting packets transmitted from inside the currently located network toward outside the currently located network, when a message indicating a refusal of a passing of the registration message transmitted by the first transmission unit is received from the packet inspection device; and a third transmission unit for transmitting a packet to be transmitted toward outside the currently located network by attaching the mobile computer identification information generated from the key information, when the key information is returned from the packet inspection device in response to the request message transmitted by the second transmission unit.

According to another aspect of the present invention there is provided a packet transfer method at a packet inspection device for inspecting packets transmitted from a computer located inside a network under own management toward another computer located outside said network, comprising the steps of: judging whether a passing of a packet transmitted from a mobile computer other than own management target computers to outside said network is permitted or not at the packet inspection device, according to a mobile computer identification information contained in said packet; sending a message indicating a refusal of the passing of said packet to said mobile computer when the judging step judges that the passing of said packet is not permitted; transferring said packet when the judging step judges that the passing of said packet is permitted; and checking whether a user information regarding a user of said mobile computer satisfies a prescribed condition or not, upon receiving a message requesting a key information for generating the mobile computer identification information from said mobile computer, and returning a requested key information to said mobile computer when the user information satisfies the prescribed condition.

According to another aspect of the present invention there is provided a packet transfer method at a mobile computer for carrying out communications while moving among inter-connected networks, comprising the steps of: (a) transmitting a registration message containing a current location information of the mobile computer to a mobile computer management device, when the mobile computer management device for managing a location information of the mobile computer and transferring packets destined to the mobile computer to a current location of the mobile computer is provided at a network other than a currently located network of the mobile computer; (b) transmitting a request message for requesting a key information for generating a mobile computer identification information, to a packet inspection device for inspecting packets transmitted from inside the currently located network toward outside the currently located network, when a message indicating a refusal of a passing of the registration message transmitted by the step (a) is received from the packet inspection device; and (c) transmitting a packet to be transmitted toward outside the currently located network by attaching the mobile computer identification information generated from the key information, when the key information is returned from the packet inspection device in response to the request message transmitted by the step (b).

According to another aspect of the present invention there is provided an article of manufacture, comprising: a computer usable medium having computer readable program code means embodied therein for causing a computer to function as a packet inspection device for inspecting packets transmitted from a computer located inside a network under own management toward another computer located outside said network, the computer readable program code means including: first computer readable program code means for causing said computer to judge whether a passing of a packet transmitted from a mobile computer other than own management target computers to outside said network is permitted or not, according to a mobile computer identification information contained in said packet, and send a message indicating a refusal of the passing of said packet to said mobile computer when the passing of said packet is judged to be not permitted; second computer readable program code means for causing said computer to transfer said packet when the first computer readable program code means judges that the passing of said packet is permitted; and third computer readable program code means for causing said computer to check whether a user information regarding a user of said mobile computer satisfies a prescribed condition or not, upon receiving a message requesting a key information for generating the mobile computer identification information from said mobile computer, and return a requested key information to said mobile computer when the user information satisfies the prescribed condition.

According to another aspect of the present invention there is provided an article of manufacture, comprising: a computer usable medium having computer readable program code means embodied therein for causing a computer to function as a mobile computer for carrying out communications while moving among inter-connected networks, the computer readable program code means including: first computer readable program code means for causing said computer to transmit a registration message containing a current location information of the mobile computer to a mobile computer management device, when the mobile computer management device for managing a location information of the mobile computer and transferring packets destined to the mobile computer to a current location of the mobile computer is provided at a network other than a currently located network of the mobile computer; second computer readable program code means for causing said computer to transmit a request message for requesting a key information for generating a mobile computer identification information, to a packet inspection device for inspecting packets transmitted from inside the currently located network toward outside the currently located network, when a message indicating a refusal of a passing of the registration message transmitted by the first transmission unit is received from the packet inspection device; and third computer readable program code means for causing said computer to transmit a packet to be transmitted toward outside the currently located network by attaching the mobile computer identification information generated from the key information, when the key information is returned from the packet inspection device in response to the request message transmitted by the second transmission unit.

Other features and advantages of the present invention will become apparent from the following description taken in conjunction with the accompanying drawings.

BRIEF DESCRIPTION OF THE DRAWINGS

FIG. 7 is a diagram showing one exemplary format of a first registration message according to one embodiment of the present invention.

FIG. 8 is a diagram showing one exemplary format of a passing refuse message according to one embodiment of the present invention.

FIG. 9 is a diagram showing one exemplary format of a key request message according to one embodiment of the present invention.

FIG. 10 is a diagram showing one exemplary format of a second registration message according to one embodiment of the present invention.

FIG. 11 is a diagram showing one exemplary format of a data packet for registration response according to one embodiment of the present invention.

FIG. 13 is a diagram showing another exemplary format of a first registration message according to one embodiment of the present invention.

FIG. 14 is a diagram showing another exemplary format of a passing refuse message according to one embodiment of the present invention.

FIG. 15 is a diagram showing another exemplary format of a key request message according to one embodiment of the present invention.

FIG. 16 is a diagram showing another exemplary format of a second registration message according to one embodiment of the present invention.

FIG. 17 is a diagram showing another exemplary format of a data packet for registration response according to one embodiment of the present invention.

DETAILED DESCRIPTION OF THE PREFERRED EMBODIMENTS

Referring now to FIG. 2 to FIG. 17, one embodiment of a packet inspection device, a mobile computer and a packet transfer method according to the present invention will be described in detail.

Figure 1:
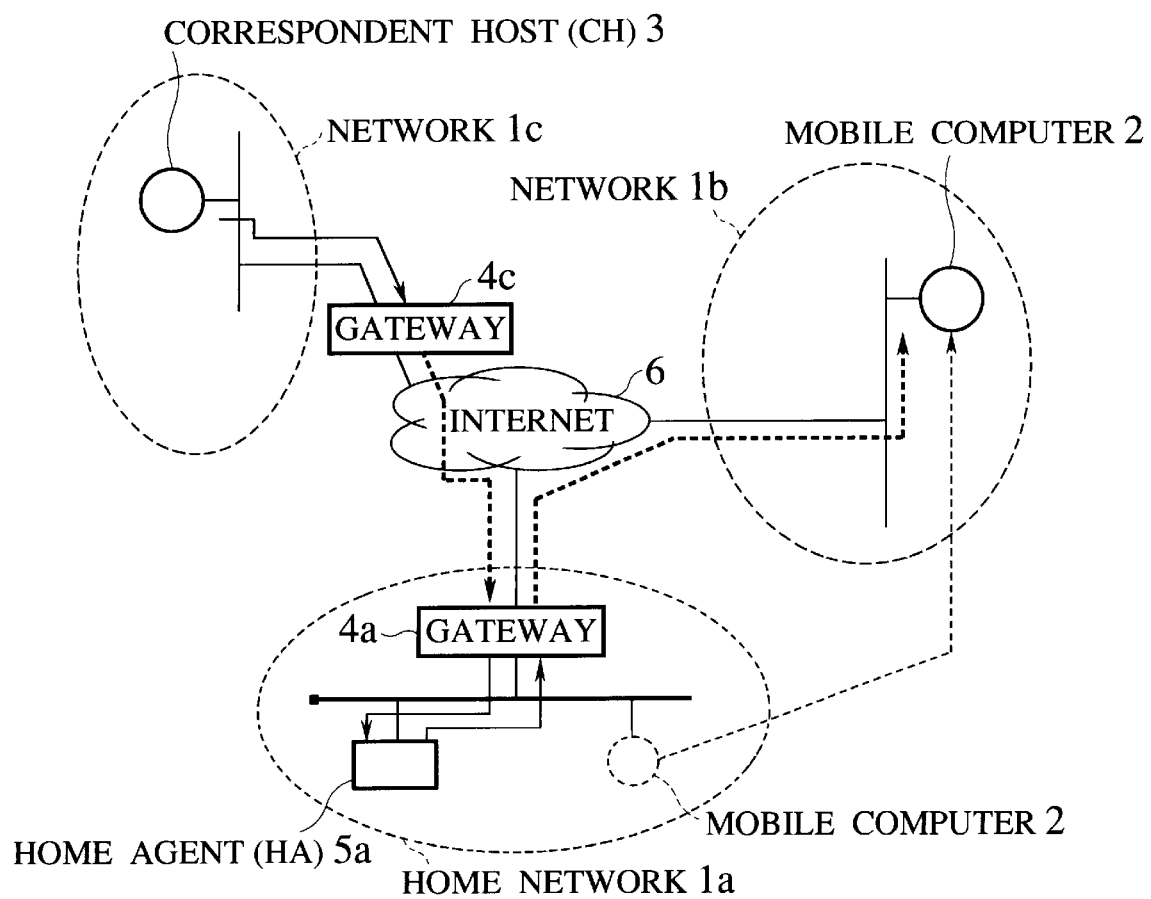
FIG. 1 is a diagram showing an exemplary conventional communication system supporting a mobile computing.
Figure 2:
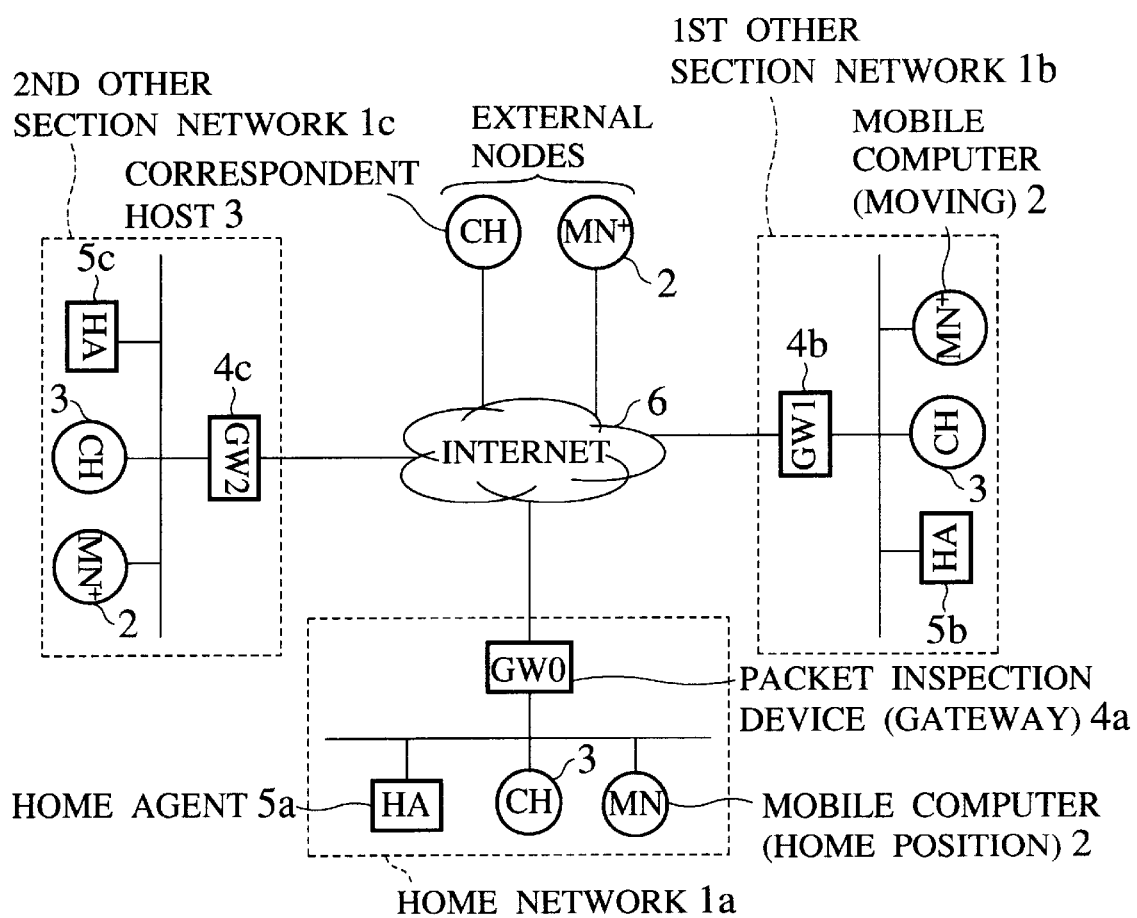
FIG. 2 is a block diagram showing a communication system using a packet inspection device and a mobile computer according to one embodiment of the present invention.

FIG. 2 shows an exemplary basic configuration of a communication system according to the present invention. This communication system of FIG. 2 is assumed to be supporting communications by mobile computers according to the mobile IP as in a case of FIG. 1 described above. Note that the mobile IP protocol has a mode which assumes an existence of a router called foreign agent which carries out the packet delivery for the mobile computer at the visited network, and a pop-up mode in which no foreign agent is to be provided (a computer on the visited site plays the role of the foreign agent as well). In this embodiment, a case of adopting the pop-up mode will be described as an example.

In FIG. 2, a home network 1a of a mobile computer (MN) 2, a first other section network 1b and a second other section network 1c are inter-connected through the Internet 6, where each of the mobile computer 2 and a correspondent host (CH) 3 of the mobile computer 2 can be connected within these networks, or connected to the Internet 6 as an external node. The networks 1a and 1b are assumed to be provided with packet inspection devices (gateways) 4a and 4b, respectively, where each packet inspection device 4 inspects packets transmitted from a computer inside the network managed by that device toward a computer outside the network. Note that a gateway 4c can also be provided in the network 1c according to the need.

In this embodiment, a case where the mobile computer 2 having a home position inside the network 1a has moved to the other section network 1b will be described.

Each of the gateways 4a, 4b and 4c is assumed to have a packet encryption and authentication processing function. Also, the mobile computer 2 is assumed to have a packet encryption and authentication processing function at least while it is moving (In the figures, the mobile computer 2 that has the packet encryption and authentication processing function is indicated as MN$^+$).

Note here that the encryption/decryption of communication data in the packet encryption and authentication processing can be realized by a scheme disclosed in IETF RFC 1825, 1827, for example. Also, the attaching/checking of authentication data (such as a hash function value generated from a transferred packet content and a generation key) in the packet encryption and authentication processing can be realized by a scheme disclosed in IETF RFC 1825, 1826, for example.

In FIG. 2, a home agent (HA) 5a for managing information on a current location at a visited site of the mobile computer is provided in the home network 1a, in order to support the mobile IP protocol. A number of mobile computers to be managed is arbitrary. Also, as described above, the transferred IP packet destined to the mobile computer 2 is sent to the home agent 5a of the mobile computer 2, and the data routing control with respect to the mobile computer 2 is carried out by encapsulating an IP packet destined to an original address (an address in a home network 1a) of the mobile computer 2 within a packet destined to a current location address of the mobile computer 2.

Note that the first and second other section networks 1b and 1c are also provided with the respective home agents 5b and 5c according to the need.

Each of the gateways 4a, 4b and 4c has a management target computer recognition function for recognizing a source computer which is the management target of that gateway. This function can be realized, for example, by providing a server device for managing a database of information indicating which gateway has which computers as its management targets (more specifically, a correspondence between a network address of each gateway and network addresses of a group of computers which are its management targets, for example), somewhere (which may be distributed) in the communication system, and operating each gateway to search through that database. Else, this function can also be realized by maintaining information indicating network addresses of a group of computers which are the management targets of each gateway, at each gateway. In the following, this latter case will be described as an example.

Figure 3:
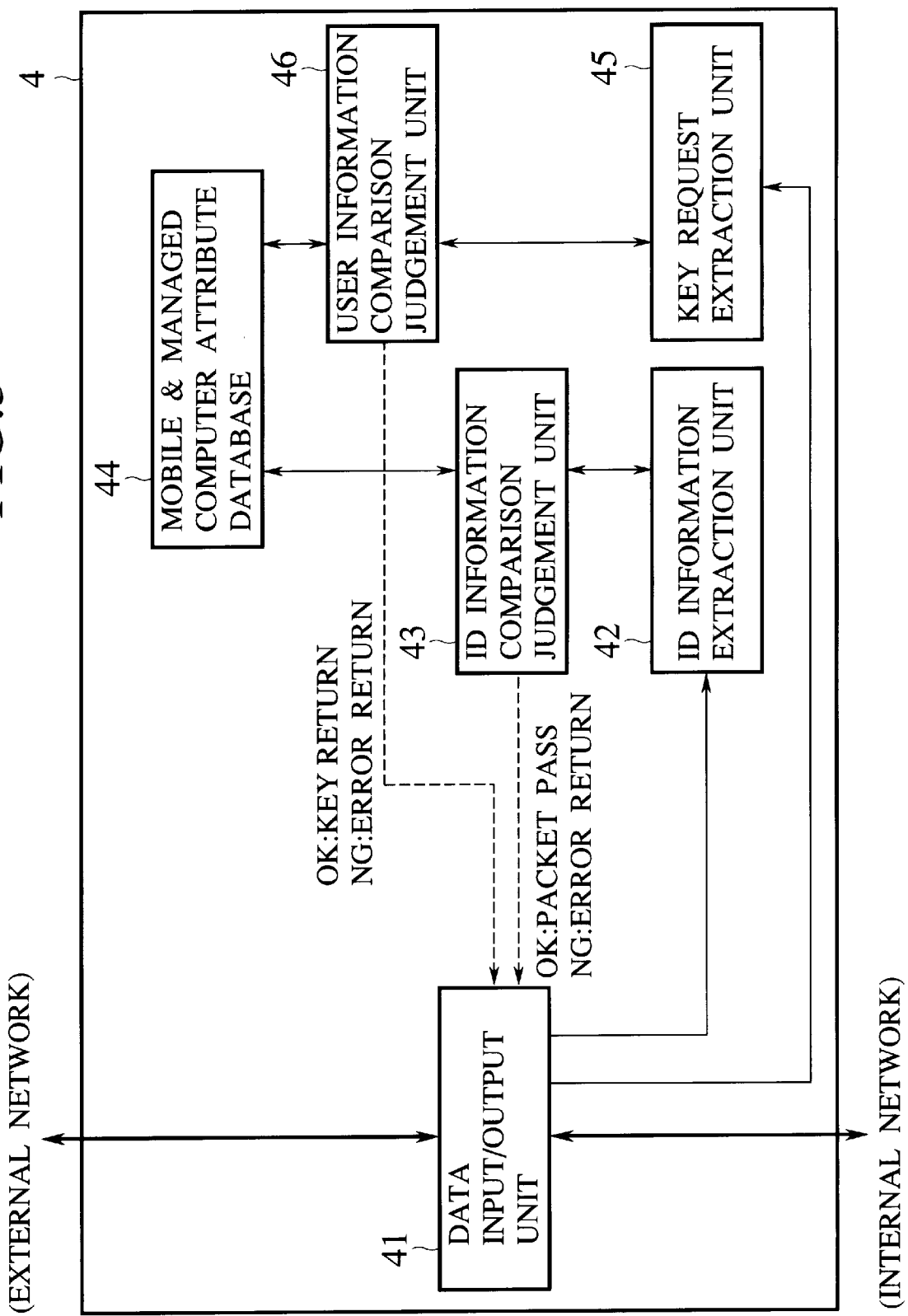
FIG. 3 is a schematic block diagram of a packet inspection device according to one embodiment of the present invention.

More specifically, each gateway 4 in this embodiment has an exemplary configuration as shown in FIG. 3, which comprises: a data input/output unit 41, an ID information extraction unit 42, an ID information comparison judgement unit 43, a mobile and managed computer attribute database 44, a key request extraction unit 45, and a user information comparison judgement unit 46.

In this gateway 4 of FIG. 3, when a packet transmitted from a computer inside the network is received at the data input/output unit 41, an ID information is extracted from this packet by the ID information extraction unit 42, and this extracted ID information is compared with data stored in the mobile and managed computer attribute database 44 by the ID information comparison judgement unit 43 so as to judge whether this is a packet transmitted from a computer managed by this gateway 4 or not. When it is a packet transmitted from a computer managed by this gateway 4, this packet is transferred as it is, whereas when it is a packet transmitted from a computer which is not managed by this gateway 4, the ID information comparison judgement unit 43 judges whether the extracted ID information is a proper mobile computer ID information or not according to the mobile and managed computer attribute database 44. If it is a proper mobile computer ID information, then the gateway 4 passes this packet after applying the necessary processing, whereas when it is not a proper mobile computer ID information, the transfer of this packet is refused.

Also, in this gateway 4 of FIG. 3, when a request for a key information necessary in generating the mobile computer ID information is received at the data input/output unit 41 from a computer for which the packet transfer is refused, a key request extraction unit 45 extracts a user information regarding a user of the mobile computer from the request message, and the user information comparison judgement unit 46 judges whether the extracted user information satisfies a prescribed condition or not according to the mobile and managed computer attribute database 44, and returns the requested key information when the extracted user information satisfies the prescribed condition.

Figure 4:
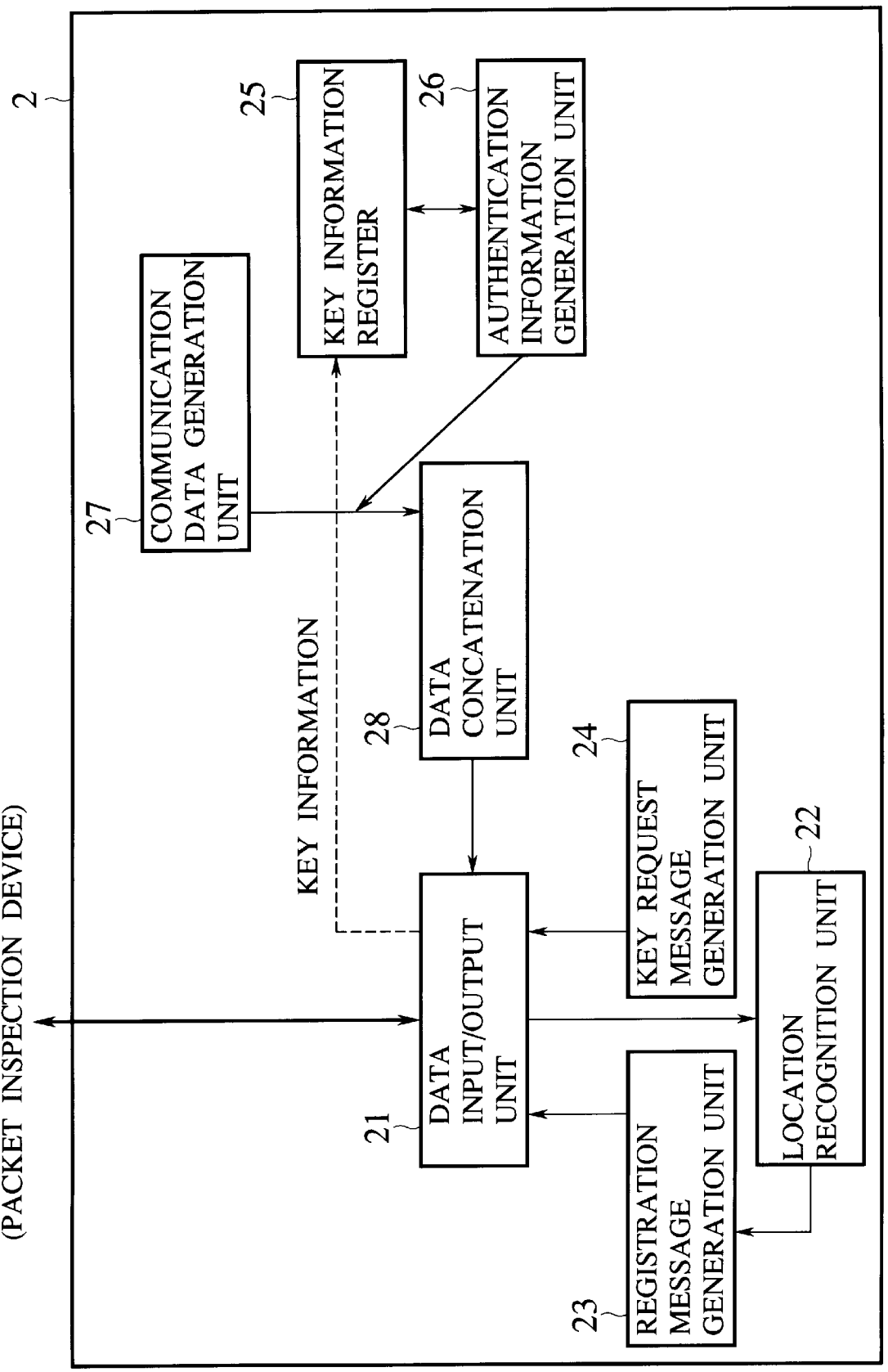
FIG. 4 is a schematic block diagram of a mobile computer according to one embodiment of the present invention.

On the other hand, the mobile computer 2 has an exemplary configuration as shown in FIG. 4, which comprises: a data input/output unit 21, a location recognition unit 22, a registration message generation unit 23, a key request message generation unit 24, a key information register 25, an authentication data generation unit 26, a communication data generation unit 27, and a data concatenation unit 28.

Here, the mobile computer 2 has the location recognition unit 22 for recognizing that the mobile computer 2 is located outside the network (home network) 1a at which the home agent 5a for managing this mobile computer 2 is provided. This location recognition can be realized, for example, by Judging whether the mobile computer 2 is located within the home network or not according to whether or not it is possible to receive the advertisement message that is regularly transmitted by the home agent 5a.

When the location recognition unit 22 judges that the mobile computer 2 has moved outside the home network, the mobile computer 2 acquires an address to be used in a visited network by using the protocol such as DHCP or PPP, at a visited network (which is 1b in this example).

When the address is acquired, the registration message generation unit 23 of the mobile computer 2 generates a registration message containing an information on a current location and this registration message is transmitted from the data input/output unit 21 to the home agent 5a of the home network 1a.

At this point, when the mobile computer 2 is the management target of the gateway 4b, the registration message passes the gateway 4b as it is, but when the mobile computer 2 is not the management target of the gateway 4b, the passing of the registration message is refused once. Then, the key request message generation unit 24 of the mobile computer 2 generates a key request message to request the key information to the gateway 4b, and when the key information is obtained and registered into the key information register 25, the mobile computer 2 transmits the registration message again by attaching a computer ID information generated by using the obtained key information. As a result, the re-transmitted registration message will be passed by the gateway 4b. Note here that if the computer which is not the management target of the gateway 4b cannot obtain the key information, this computer cannot pass a packet through the gateway 4b to the outside.

As the mobile computer ID to be used by the gateway and the mobile computer, the authentication data such as the one way hash function value (such as that of the Keyed MD5 scheme) generated from a transferred packet content and a generation key can be used, for example.

Then, when the registration message reaches to the home agent 5a of the home network 1a of the mobile computer 2, the home agent 5a registers an information capable of uniquely identifying a location of the mobile computer 2 within the entire networks into its management table (and, at this point, the home agent 5a recognizes that the mobile computer 2 has moved outside the home network 1a). Also, at the visited network 1b, a setting is made in a management table of the gateway 4b so that a packet transferred from the Internet 6 side which is destined to this mobile computer 2 will be transferred to the home agent 5a.

By means of the above, a packet destined to the mobile computer 2 that is transferred from the Internet 6 to the home network 1a of the mobile computer 2 will be given to the home agent 5a once, and further transferred to a visiting site of the mobile computer 2 from there. At this point, at the home agent 5a, the processing for encapsulating an IP packet destined to the original address (address in the home network 1a) of the mobile computer 2 within a packet destined to a current location address of the mobile computer 2 as described above will be carried out.

Then, after the message indicating the transfer refusal is received once with respect to the registration message and then a permission response is received by the exchanges of the key information and the computer ID information, the mobile computer 2 transmits packets destined to the correspondent host computer 3 as generated by the communication data generation unit 27, from the data input/output unit 21, by attaching the computer ID information as generated by the authentication data generation unit 26, at the data concatenation unit 28. When a permission response is received with respect to the registration message without receiving the transfer refusal once, the packets destined to the correspondent host computer 3 are transmitted as usual.

Figure 5:
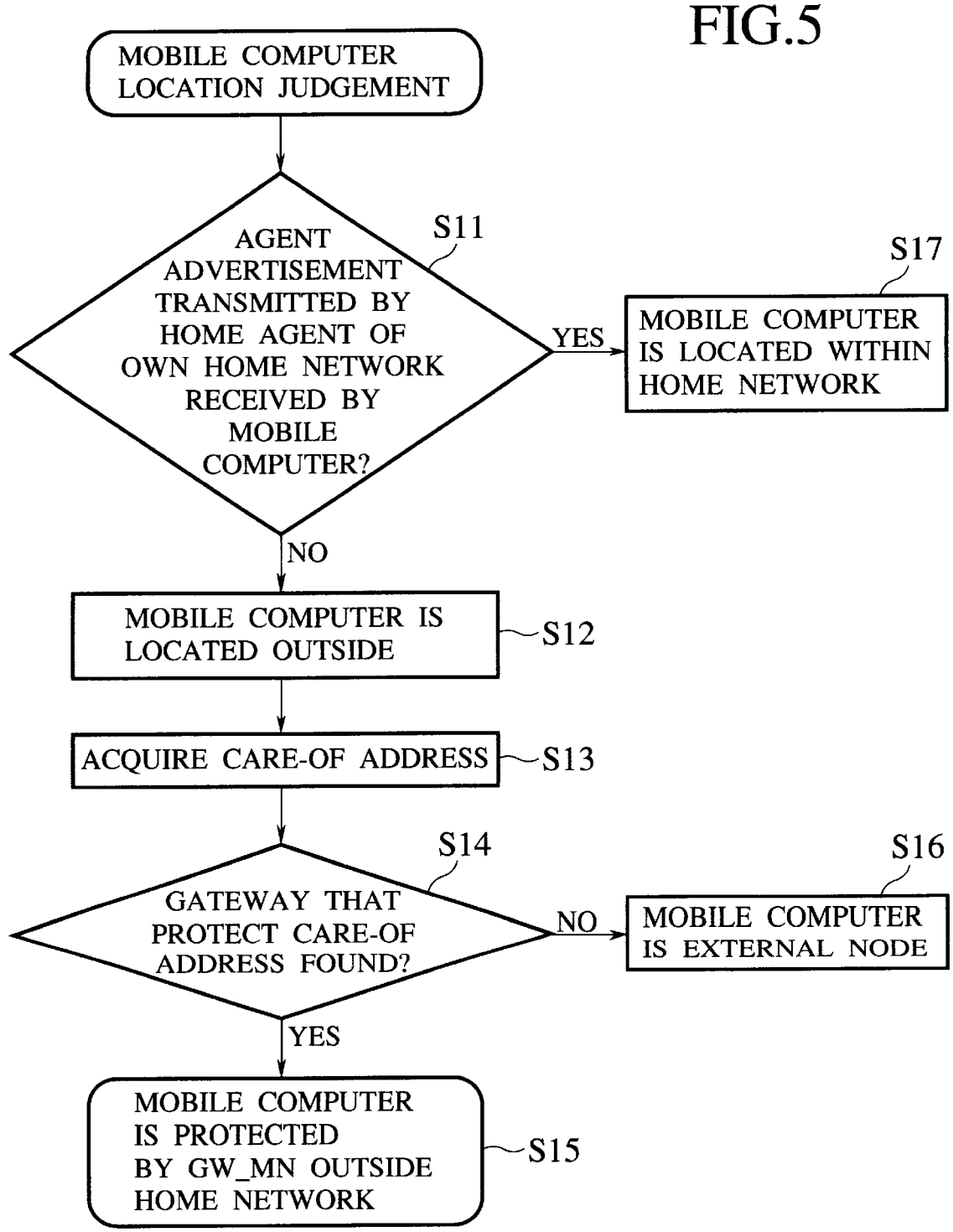
FIG. 5 is a flow chart for a mobile computer location judgement processing according to one embodiment of the present invention.

In further detail, the processing for detecting a current location of the mobile computer 2 can be carried out according to the procedure of FIG. 5 as follows.

Here, as specified by the mobile IP, each home agent is assumed to be regularly transmitting the agent advertisement message within the subnet in which it is operated. Also, each gateway is assumed to be disclosing a list of addresses of computers which are inspection targets of each gateway, so that it is possible to search a gateway that is responsible for checking transmission packets of a given computer.

At the mobile computer 2 side, first, whether this mobile computer 2 is located inside the home network 1a or outside the home network 1a is judged. Here, whether it is located inside the home network 1a or not is detected by trying to receive the agent advertisement message transmitted by the home agent 5a that manages this mobile computer 2 (step S11). When the agent advertisement message the home agent 5a of the home network 1a to which this mobile computer 2 belongs is received, it is judged that this mobile computer 2 is located inside the home network 1a (step S17). When the agent advertisement message by the other home agent or when the agent advertisement message cannot be received, it is judged that this mobile computer 2 is located outside the home network 1a (step S12).

When this mobile computer 2 is judged to be located outside the home network 1a, this mobile computer 2 acquires the care-of address of the mobile IP by means of DHCP and the like (step S13).

Also, the mobile computer 2 searches a gateway (GW_MN) that protects this care-of address (step S14).

When such a gateway (GW_MN) is found, it is judged that the mobile computer 2 is protected by this gateway GW_MN outside the home network (step S15). In addition, when the gateway (GW_MN) found by the search coincides with the gateway of the home network (when the mobile computer 2 moved to another subnet within the home network 1a, for example), this mobile computer 2 is judged to be located inside a home domain [MN-home]. Otherwise, this mobile computer 2 is judged to be located outside a home domain [MN-foreign]. When it is judged to be located inside the home domain, the registration request is transmitted in the usual IP packet format, without executing the following location registration processing sequence.

Note that, when there is no gateway that protects the care-of address, the mobile computer 2 is judged as an external node (step S16).

Now, in the mobile IP scheme, when the mobile computer moves to a new visiting site, it is necessary for this mobile computer to send a registration message containing an information on a current location to the home agent which manages this mobile computer. In this case, when the mobile computer moved to a network which is familiar to the home network of the mobile computer so that a gateway provided there freely allows the transmission of the registration message or the data packets from this mobile computer to outside the network, it is possible for the mobile computer to carry out the operation exactly as specified by the mobile IP.

On the other hand, in a general network which treats the mobile computer as visiting (or intruding) inside the network from outside the network, it is judged to be dangerous to freely allow the transmission of the message issued by the mobile computer to outside the network, from a viewpoint of the security, so that the gateway provided there once refuses to pass the registration message or the data packets transmitted by a mobile computer other than the management target computers of that gateway. In such a case, it becomes necessary for the mobile computer to recognize that it is currently located in a network which treats it as an intruder, and carries out the transmission of the registration message to the home agent after obtaining a permission for external access by carrying out a processing for establishing the own identification with respect to the gateway.

Now, one example of the processing procedure related to the registration message according to this embodiment will be described. Here, an exemplary case of not using the encryption of the data portion within the packet will be described.

First, in a case where the mobile computer 2 is located in the home domain [MN-home], it suffices to check the IP address of the home agent (HA) and the IP address of the mobile computer (MN), send the registration request in the usual IP packet format with the mobile computer as a source and the home agent as a destination, and receive a response in the IP packet format from the home agent, so that the transmission of the registration message is unnecessary.

Note that the IP addresses of the home agent and the mobile computer are assumed to be the private addresses in the home network here.

Next, a case where the mobile computer 2 has moved outside the home domain [MN-foreign] will be described.

Figure 6:
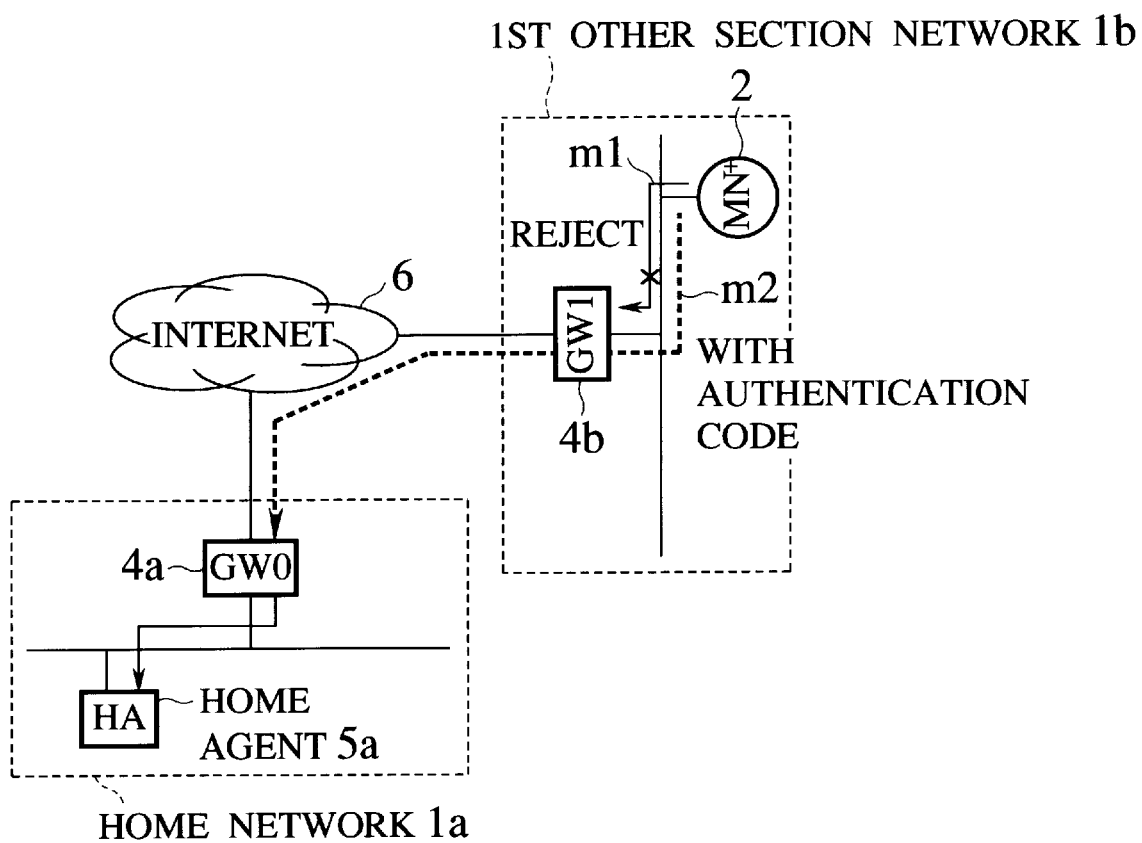
FIG. 6 is a diagram for explaining a registration message transmission procedure according to one embodiment of the present invention.

For example, in a case where the mobile computer 2 has moved to the first other section network 1b as shown in FIG. 6, the mobile computer 2 first sends a first registration message.

FIG. 7 shows one example of this first registration message, where the IP header has the private address of the mobile computer (MN) as a source and the private address of the home agent (HA) as a destination.

In response to this first registration message, if the mobile computer 2 has moved to a network familiar to the home network 1a so that the gateway there freely allows the transmission of the registration message to outside, a permission response will be returned so that there is no problem. However, in a case where the gateway 4b is a gateway that returns a message for refusing to pass the registration message upon receiving a packet not destined to this gateway from a computer which is not a management target of this gateway, a passing refuse message will be returned.

FIG. 8 shows one example of this passing refuse message which is realized in an extended format of an ICMP message of the TCP/IP communication, where the IP header has the global address of the gateway 4b (GW1) as a source and the care-of address of the mobile computer (MN) as a destination.

In this case, the mobile computer 2 transmits a key request message with respect to the gateway 4b by using the global address of the gateway 4b contained in this passing refuse message, so as to make a query for the public key.

FIG. 9 shows one example of this key request message, where the IP header has the care-of address of the mobile computer (MN) as a source and the global address of the gateway 4b (GW1) as a destination.

In response to this key request message, the judgement by the gateway 4b as to whether or not to give the public key information is depending on the system management policy at the site of the gateway 4b. For example, rules such as the following can be registered at the gateway 4b.

The key information is given if it is a user belonging to the company, upon checking the user ID information attached to the key request message in a prescribed format.

The key information is given if it is a user not belonging to the company but belonging to a prescribed organization.

Otherwise, the information is given if it is a user registered in advance.

A method of user registration with respect to the gateway 4b can be set up arbitrarily according to the system properties.

When the public key of the gateway 4b is obtained in response to the key request message, the mobile computer 2 transmits a second registration request.

FIG. 10 shows one example of this second registration message, where the IP header1 has the care-of address of the mobile computer (MN) as a source and the global address of the gateway 4b (GW1) as a destination, and KEY information and AH information are attached therein.

The KEY information is a header information containing the key information to be shared between the source node and the destination node of the IP header1 (between the mobile computer 2 and the gateway 4b here).

The AH information is a header information containing the authentication data generated by using the above key.

Also, the inner IP header (registration request) has the private address of the mobile computer (MN) as a source and the private address of the home agent (HA) as a destination.

This second registration message is destined to the gateway 4b and attached with the AH information (mobile computer ID information) containing the authentication data with respect to the gateway 4b, so that the gateway 4b carries out the authentication processing, and when this is successful, this second registration message will be passed.

As a result, the gateway 4b transfers this registration message to the next hop gateway 4a. Then, this registration message arrives at the home agent 5a via the Internet 6 and the gateway 4a, and the necessary registration processing is carried out there. Also, the home agent 5a transmits the registration response message with respect to the mobile computer 2.

The registration response message transmitted from the home agent 5a reaches to the gateway 4b by being relayed at the gateway 4a. At the gateway 4b, this registration response message is modified as shown in FIG. 11 and then transferred to the mobile computer. In FIG. 11, the IP header has the global address of the gateway 4b (GW1) as a source and the care-of address of the mobile computer (MN) as a destination, and the KEY information and the AH information are attached therein. Also, the inner IP header (registration response) has the private address of the home agent (HA) as a source and the private address of the mobile computer (MN) as a destination.

Alternatively, it is also possible for the gateway 4b to transfer this packet to the mobile computer in a format where the IP header1, the KEY information and the AH information are removed from that of FIG. 11.

Note that, in a case of carrying out the link authentication between the gateway 4a and the gateway 4b, each gateway attaches to this packet the KEY information, the AH information, and the IP header with respect to the next hop as described above (or when the KEY information and the like with respect to the previous hop were attached to the packet, these will be replaced by those with respect to the next hop).

When the above described registration processing is completed, the mobile computer 2 thereafter transfers the packet by attaching the authentication data between the mobile computer 2 and the gateway 4b, even in a case of carrying out the data communication with the corespondent host computer 3 located outside the visited network 1b. By checking whether this authentication data is attached or not, it is possible for the gateway 4b to properly judge whether it is a properly recognized visiting node or not, and therefore it becomes possible to carry out the message control for the mobile computer which is proper from a viewpoint of the security.

Next, another example of the processing procedure related to the registration message according to this embodiment will be described. Here, an exemplary case that includes a case of using the encryption of the data portion within the packet will be described. In this example, the packet inspection device functions as a packet encryption gateway.

This example is directed to a case of applying the present invention to a communication system which adopts a scheme in which the link authentication as described above is defined in conjunction with the encryption of packet content and the packet authentication between ends, as described in IEFT RFC 1825 to 1829.

In the IETF, a method for attaching the authentication code to an IP packet is specified as the IP security standard (see IEFT RFC 1826, 1828), and this method is utilized here so that the authentication data between the mobile computer and the gateway of the visited network is attached to the data packet as a processing for establishing the identification of the mobile computer, and the packet is passed to the outside at the gateway after the authentication code of the received packet is checked. In this manner, even when a user who is outsider of the organization comes in and requests to transmit the data packet to outside the network, the gateway can permit the external access only to such a mobile computer which has established the identification by exchanging the authentication key by a prescribed method.

FIGS. 12A to 12D show exemplary packet formats to be processed by each gateway (packet encryption gateway).

Figure 12A:
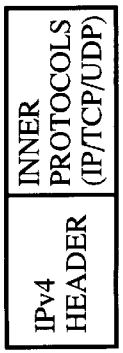
FIGS. 12A, 12B, 12C and 12D are diagrams showing four exemplary packet formats to be processed by a packet inspection device according to one embodiment of the present invention.

FIG. 12A shows a usual IP packet format.

Figure 12B:

FIG. 12B shows an encryption/end-to-end authentication format, which is a format for carrying out the packet encryption and authentication between end gateways or between an end gateway and the mobile computer.

Figure 12C:
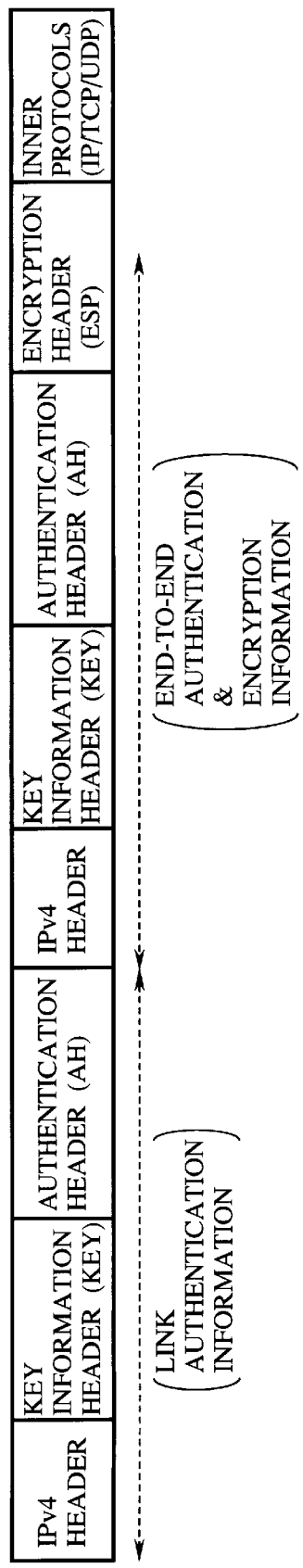

FIG. 12C shows an encryption/link authentication format, which is to be used in a case which requires the authentication between gateways on intermediate routes or between a gateway on an intermediate route and the mobile computer.

Figure 12D:

FIG. 12D shows a mobile IP format, which is a packet format to be routing controlled by the home agent into a form destined to the mobile computer.

First, in a case where the mobile computer 2 is located in the home domain [MN-home], it is the same as the previous case, so that it suffices to check the private address of the home agent (HA) and the private address of the mobile computer (MN), send the registration request in the usual IP packet format, and receive a response in the IP packet format, so that the transmission of the registration message is unnecessary.

Next, in a case where the mobile computer 2 has moved outside the home domain [MN-foreign], the first registration message is sent by checking the global address of the gateway (GW0) of the home network, the public key of the gateway (GW0) of the home network, the care-of address and the private address of the mobile computer (MN), and the private address of the home agent (HA).

FIG. 13 shows one example of this first registration message, where the IP header has the care-of address of the mobile computer (MN) as a source and the global address of the gateway 4a (GW0) as a destination, and KEY information, AH information and ESP information are attached therein.

The KEY information is a header information containing the key information to be shared between the source node and the destination node of the IP header (between the mobile computer 2 and the gateway 4a here).

The AH information is a header information containing the authentication data generated by using the above key.

The ESP information is a header information containing an information for specifying an algorithm for decrypting the encrypted inner data (the inner IP header and its data portion here).

Also, the inner IP header (registration request) has the private address of the mobile computer (MN) as a source and the private address of the home agent (HA) as a destination.

In response to this first registration message, if the mobile computer 2 has moved to a network familiar to the home network 1a so that the gateway there freely allows the transmission of the registration message to outside, a permission response will be returned so that there is no problem. However, in a case where the gateway 4b is a gateway that returns a message for refusing to pass the registration message upon receiving a packet not destined to this gateway from a computer which is not a management target of this gateway, a passing refuse message will be returned.

FIG. 14 shows one example of this passing refuse message. which is realized in an extended format of an ICMP message of the TCP/IP communication, where the IP header has the global address of the gateway 4b (GW1) as a source and the care-of address of the mobile computer (MN) as a destination.

In this case, the mobile computer 2 transmits a key request message with respect to the gateway 4b by using the global address of the gateway 4b contained in this passing refuse message, so as to make a query for the public key.

FIG. 15 shows one example of this key request message, where the IP header has the care-of address of the mobile computer (MN) as a source and the global address of the gateway 4b (GW1) as a destination.

As in the previous case, in response to this key request message, the judgement by the gateway 4b as to whether or not to give the public key information is depending on the system management policy at the site of the gateway 4b.

When the public key of the gateway 4b is obtained in response to the key request message, the mobile computer 2 transmits a second registration request.

FIG. 16 shows one example of this second registration message, where the IP header1 has the care-of address of the mobile computer (MN) as a source and the global address of the gateway 4b (GW1) as a destination, and KEY1 information and AH information are attached therein.

The KEY1 information is a header information containing the key information to be shared between the source node and the destination node of the IP header1 (between the mobile computer 2 and the gateway 4b here).

The AH information is a header information containing the authentication data generated by using the above key.

Also, the IP header2 has the care-of address of the mobile computer (MN) as a source and the global address of the gateway 4a (GW0) as a destination, and KEY2 information, AH information and ESP information are attached therein.

The KEY2 information is a header information containing the key information to be shared between the source node and the destination node of the IP header2 (between the mobile computer 2 and the gateway 4a here).

The AH information is a header information containing the authentication data generated by using the above key.

The ESP information is a header information containing an information for specifying an algorithm for decrypting the encrypted inner data (the inner IP header and its data portion here).

Also, the inner IP header (registration request) has the private address of the mobile computer (MN) as a source and the private address of the home agent (HA) as a destination.

This second registration message is destined to the gateway 4b and attached with the AH information (mobile computer ID information) containing the authentication data with respect to the gateway 4b, so that the gateway 4b carries out the authentication processing, and when this is successful, this second registration message will be passed.

As a result, the gateway 4b transfers this registration message to the next hop gateway 4a. Then, this registration message arrives at the home agent 5a via the Internet 6 and the gateway 4a, and the necessary registration processing is carried out there. Also, the home agent 5a transmits a registration response message with respect to the mobile computer 2.

The registration response message transmitted from the home agent 5a (which is encapsulated within the KEY2 information, the AH information and the IP header2) reaches to the gateway 4b by being relayed at the gateway 4a. At the gateway 4b, this registration response message is modified as shown in FIG. 17 and then transferred to the mobile computer.

In FIG. 17, the IP header1 has the global address of the gateway 4b (GW1) as a source and the care-of address of the mobile computer (MN) as a destination, and the KEY1 information and the AH information are attached therein. Also, the IP header2 has the global address of the gateway 4a (GW0) as a source and the care-of address of the mobile computer (MN) as a destination, and the KEY2 information, the AH information and the ESP information are attached therein. Also, the inner IP header (registration response) has the private address of the home agent (HA) as a source and the private address of the mobile computer (MN) as a destination.

Alternatively, it is also possible for the gateway 4b to transfer this packet to the mobile computer in a format where the IP header1, the KEY1 information and the AH information are removed from that of FIG. 17.

Note that, in a case of carrying out the link authentication between the gateway 4a and the gateway 4b, each gateway attaches to this packet the KEY1 information, the AH information, and the IP header1 with respect to the next hop as described above (or when the KEY information and the like with respect to the previous hop were attached to the packet, these will be replaced by those with respect to the next hop).

When the above described registration processing is completed, the mobile computer 2 thereafter transfers the packet by attaching the authentication data between the mobile computer 2 and the gateway 4b (which can also be implemented by the extension of the IPSEC), even in a case of carrying out the data communication with the corespondent host computer 3 located outside the visited network 1b. By checking whether this authentication data is attached or not, it is possible for the gateway 4b to properly judge whether it is a properly recognized visiting node or not, and therefore it becomes possible to carry out the message control for the mobile computer which is proper from a viewpoint of the security.

Note that, in the examples described above, when the passing of the packet is refused once from the gateway at the visited network, the packet is transmitted by attaching the authentication data after the prescribed procedure, but instead of that, it is also possible to register the mobile computer for which the authentication was successful as a management target in the management table of the gateway, so that the authentication can be omitted thereafter for this mobile computer. In this case, after the registration, the mobile computer can transmit the packet without attaching the authentication data.

Now, in the conventional mobile IP scheme, the routing control and the mobile computer location registration have been specified only under the assumption that each network node is assigned with a unique IP address and capable of exchanging control packets freely, but according to this embodiment, at a time of the actual operation, it is possible to account for the operation specification on the network operating policy regarding a kind of organization to which the visited network of the mobile computer belongs.

In particular, even when the mobile computer has moved to a network which does not freely allow the external access to an internal computer in view of the security, at a time of transmission of a registration message for a new location to be carried out immediately after the moving or at a time of transmission of usual communication data, the mobile computer can recognize that it is located in a network of an external organization, and carries out the external access after the processing for establishing the own identification with respect to the gateway of the visited network, so that only packets from the mobile computer which has gone through the proper processing can be selectively passed, and therefore it becomes possible to realize the highly safe and flexible mobile computer control.

As a result, it is possible to carry out the packet transfer from the mobile computer to outside that network by properly observing the security policy of that network, and it is possible to permit the communication with the external to a proper mobile computer which is visiting from the external, in clear distinction from a computer which attempts to carry out the communication with the external improperly by intruding inside that network.

Also, in this embodiment, the uniform processing can be carried out at the mobile computer and the gateway by attaching the authentication code to the packet itself, so that there is no need for a table management processing for individual mobile computers, and therefore the fast authentication is possible. In particular, it is effective when used in conjunction with the IP security processing such as the packet encryption and the packet content authentication between ends of the communication.

Thus, according to the packet inspection device of the present invention, it is possible to realize a control to pass only packets from those mobile computers that can be recognized as authenticated among non-management target mobile computers that had moved inside the network, to outside the network.

Also, according to the mobile computer of the present invention, it is possible to realize such a control that, when the mobile computer has moved to a network which initially regards this mobile computer as an intruder, the authenticity of this mobile computer is checked between this mobile computer and the packet inspection device so that packets from this mobile computer can be passed to outside the network from the packet inspection device.

It is to be noted that the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, the packet inspection device in the above described configuration of FIG. 3 (with or without the mobile and managed computer attribute database 44) and a mobile computer in the above described configuration of FIG. 4 can be conveniently implemented in forms of separate software packages.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that this embodiment has been described for a communication system using the pop-up mode, but the present invention is equally applicable to a communication system that assumes the existence of the foreign agent.

It is also to be noted that the present invention is equally applicable to any of the currently proposed mobile communication protocols, the cipher communication protocols, and the secret key exchange protocols.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A packet inspection device for inspecting packets transmitted from a computer located inside a network under own management toward another computer located outside said network, comprising:

a judging unit configured to judge whether a passing of a packet transmitted from a mobile computer other than own management target computers to outside said network is permitted or not, according to a mobile computer identification information contained in said packet, and to send a message indicating a refusal of the passing of said packet to said mobile computer when the passing of said packet is judged to be not permitted;

a transfer unit configured to transfer said packet when the judging unit judges that the passing of said packet is permitted;

a key information returning unit configured to check whether a user information regarding a user of said mobile computer satisfies a prescribed condition or not, upon receiving a message requesting a key information for generating the mobile computer identification information from said mobile computer, and to return a requested key information to said mobile computer when the user information satisfies the prescribed condition; and a management target computer recognition unit configured to indicate the own management target computers managed by the packet inspection device;

wherein the judging unit judges that a passing of one packet transmitted from one computer inside said network is permitted when the management target computer recognition unit indicates that said one packet is transmitted from one of the own management target computers.

2. The packet inspection device of claim 1, further comprising:

a management target computer recognition unit for indicating the own management target computers managed by the packet inspection device;

wherein the judging unit judges that a passing of one packet transmitted from one computer inside said network is not permitted when the management target computer recognition unit indicates that said one packet is transmitted from a computer other than the own management target computers, and said one packet does not contain the mobile computer identification information.

3. The packet inspection device of claim 2, wherein the judging unit judges that a passing of said one packet is permitted when the management target computer recognition unit indicates that said one packet is transmitted from a computer other than the own management target computers, said one packet contains the mobile computer identification information, and an authenticity of said one computer is checked according the mobile computer identification information contained in said one packet.

4. A mobile computer for carrying out communications while moving among inter-connected networks, comprising:

a first transmission unit configured to transmit a registration message containing a current location information of the mobile computer to a mobile computer management device, when the mobile computer management device for managing a location information of the mobile computer and transferring packets destined to the mobile computer to a current location of the mobile computer is provided at a network other than a currently located network of the mobile computer;

a second transmission unit configured to transmit a request message for requesting a key information for generating a mobile computer identification information, to a packet inspection device for inspecting packets transmitted from inside the currently located network toward outside the currently located network, when a message indicating a refusal of a passing of the registration message transmitted by the first transmission unit is received from the packet inspection device; and a third transmission unit configured to transmit a packet to be transmitted toward outside the currently located network by attaching the mobile computer identification information generated from the key information, when the key information is returned from the packet inspection device in response to the request message transmitted by the second transmission unit;

wherein the first transmission unit transmits the registration message containing the current location information of the mobile computer to the mobile computer management device bv attaching the mobile computer identification information after the key information is returned from the packet inspection device in response to the request message, and after a permission response with respect to the registration message is received from the mobile computer management device, the third transmission unit causes said computer to transmit a data packet to a correspondent computer by attaching the mobile computer identification information.

5. The mobile computer of claim 4, wherein the third transmission unit transmits a data packet to a correspondent computer without attaching the mobile computer identification information when said message indicating a refusal of a passing of the registration message transmitted by the first transmission unit is not received from the packet inspection device.

6. A packet transfer method at a packet inspection device for inspecting packets transmitted from a computer located inside a network under own management toward another computer located outside said network, comprising the steps of:

judging whether a passing of a packet transmitted from a mobile computer other than own management target computers to outside said network is permitted or not at the packet inspection device, according to a mobile computer identification information contained in said packet;

sending a message indicating a refusal of the passing of said packet to said mobile computer when the judging step judges that the passing of said packet is not permitted;

transferring said packet when the judging step judges that the passing of said packet is permitted; and checking whether a user information regarding a user of said mobile computer satisfies a prescribed condition or not, upon receiving a message requesting a key information for generating the mobile computer identification information from said mobile computer, and returning a requested key information to said mobile computer when the user information satisfies the prescribed condition;

wherein the packet inspection device has a management target computer recognition unit for indicating the own management target computers managed by the packet inspection device; and the judging step judges that a passing of one packet transmitted from one computer inside said network is permitted when the management target computer recognition unit indicates that said one packet is transmitted from one of the own management target computers.

7. The packet transfer method of claim 6, wherein the packet inspection device has a management target computer recognition unit for indicating the own management target computers managed by the packet inspection device; and wherein the judging step judges that a passing of one packet transmitted from one computer inside said network is not permitted when the management target computer recognition unit indicates that said one packet is transmitted from a computer other than the own management target computers, and said one packet does not contain the mobile computer identification information.

8. The packet transfer method of claim 7, wherein the judging step judges that a passing of said one packet is permitted when the management target computer recognition unit indicates that said one packet is transmitted from a computer other than the own management target computers, said one packet contains the mobile computer identification information, and an authenticity of said one computer is checked according the mobile computer identification information contained in said one packet.

9. A packet transfer method at a mobile computer for carrying out communications while moving among interconnected networks, comprising the steps of:

(a) transmitting a registration message containing a current location information of the mobile computer to a mobile computer management device, when the mobile computer management device for managing a location information of the mobile computer and transferring packets destined to the mobile computer to a current location of the mobile computer is provided at a network other than a currently located network of the mobile computer;

(b) transmitting a request message for requesting a key information for generating a mobile computer identification information, to a packet inspection device for inspecting packets transmitted from inside the currently located network toward outside the currently located network, when a message indicating a refusal of a passing of the registration message transmitted by the step (a) is received from the packet inspection device; and (c) transmitting a packet to be transmitted toward outside the currently located network by attaching the mobile computer identification information generated from the key information, when the key information is returned from the packet inspection device in response to the request message transmitted by the step (b);

wherein the step (a) transmits the registration message containing the current location information of the mobile computer to the mobile computer management device by attaching the mobile computer identification information after the key information is returned from the packet inspection device in response to the request message, and after a permission response with respect to the registration message is received from the mobile computer management device, the step (c) cause said computer to transmit a data packet to a correspondent computer by attaching the mobile computer identification information.

10. The packet transfer method of claim 9, wherein the step (c) transmits a data packet to a correspondent computer without attaching the mobile computer identification information when said message indicating a refusal of a passing of the registration message transmitted by the step (a) is not received from the packet inspection device.

11. A computer usable medium having computer readable program codes embodied therein for causing a computer to function as a packet inspection device for inspecting packets transmitted from a computer located inside a network under own management toward another computer located outside said network, the computer readable program codes including:

a first computer readable program code for causing said computer to judge whether a passing of a packet transmitted from a mobile computer other than own management target computers to outside said network is permitted or not, according to a mobile computer identification information contained in said packet, and send a message indicating a refusal of the passing of said packet to said mobile computer when the passing of said packet is judged to be not permitted;

a second computer readable program code for causing said computer to transfer said packet when the first computer readable program code judges that the passing of said packet is permitted;

a third computer readable program code for causing said computer to check whether a user information regarding a user of said mobile computer satisfies a prescribed condition or not, upon receiving a message requesting a key information for generating the mobile computer identification information from said mobile computer, and return a requested key information to said mobile computer when the user information satisfies the prescribed condition; and a fourth computer readable program code for causing said computer to indicate the own management target computers managed by the packet inspection device;

wherein the first computer readable program code causes said computer to judge that a passing of one packet transmitted from one computer inside said network is permitted when the fourth computer readable program code indicates that said one packet is transmitted from one of the own management target computers.

12. The article of manufacture of claim 11, wherein the computer readable program code means further includes:

fourth computer readable program code means for causing said computer to indicate the own management target computers managed by the packet inspection device;

wherein the first computer readable program code means causes said computer to judge that a passing of one packet transmitted from one computer inside said network is not permitted when the fourth computer readable program code means indicates that said one packet is transmitted from a computer other than the own management target computers, and said one packet does not contain the mobile computer identification information.

13. The article of manufacture of claim 12, wherein the first computer readable program code means causes said computer to judge that a passing of said one packet is permitted when the fourth computer readable program code means indicates that said one packet is transmitted from a computer other than the own management target computers, said one packet contains the mobile computer identification information, and an authenticity of said one computer is checked according the mobile computer identification information contained in said one packet.

14. A computer usable medium having computer readable program codes embodied therein for causing a computer to function as a mobile computer for carrying out communications while moving among inter-connected networks, the computer readable program codes including:

a first computer readable program code for causing said computer to transmit a registration message containing a current location information of the mobile computer to a mobile computer management device, when the mobile computer management device for managing a location information of the mobile computer and transferring packets destined to the mobile computer to a current location of the mobile computer is provided at a network other than a currently located network of the mobile computer;

a second computer readable program code for causing said computer to transmit a request message for requesting a key information for generating a mobile computer identification information, to a packet inspection device for inspecting packets transmitted from inside the currently located network toward outside the currently located network, when a message indicating a refusal of a passing of the registration message transmitted by the first transmission unit is received from the packet inspection device; and a third computer readable program code for causing said computer to transmit a packet to be transmitted toward outside the currently located network by attaching the mobile computer identification information generated from the key information, when the key information is returned from the packet inspection device in response to the request message transmitted by the second transmission unit;

wherein the first computer readable program code causes said computer to transmit the registration message containing the current location information of the mobile computer to the mobile computer management device by attaching the mobile computer identification information after the key information is returned from the packet inspection device in response to the request message, and after a permission response with respect to the registration message is received from the mobile computer management device the third computer readable program code causes said computer to transmit a data packet to a correspondent computer by attaching the mobile computer identification information.

15. The article of manufacture of claim 14, wherein the third computer readable program code means causes said computer to transmit a data packet to a correspondent computer without attaching the mobile computer identification information when said message indicating a refusal of a passing of the registration message transmitted by the first computer readable program code means is not received from the packet inspection device.

* * * * *